April 10, 1956    J. H. JAGGER    2,741,089
CONTROLLING FUEL SUPPLY FOR AN AIRCRAFT GAS TURBINE
ENGINE DURING ACCELERATION AT DIFFERENT ALTITUDES
Filed Jan. 7, 1952    4 Sheets-Sheet 3
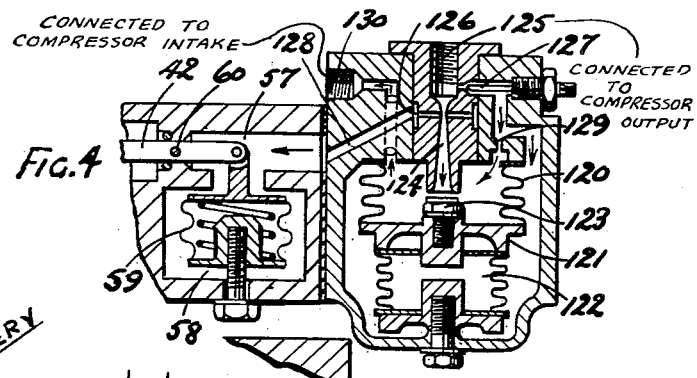
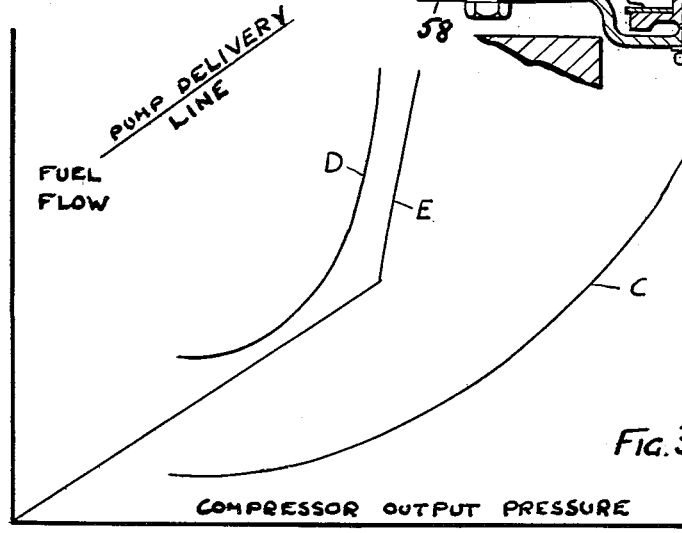
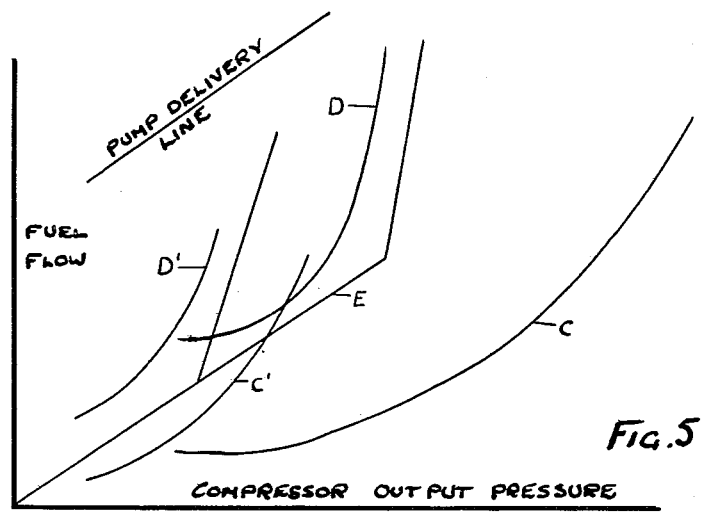
INVENTOR
JAMES H. JAGGER
ATTYS.

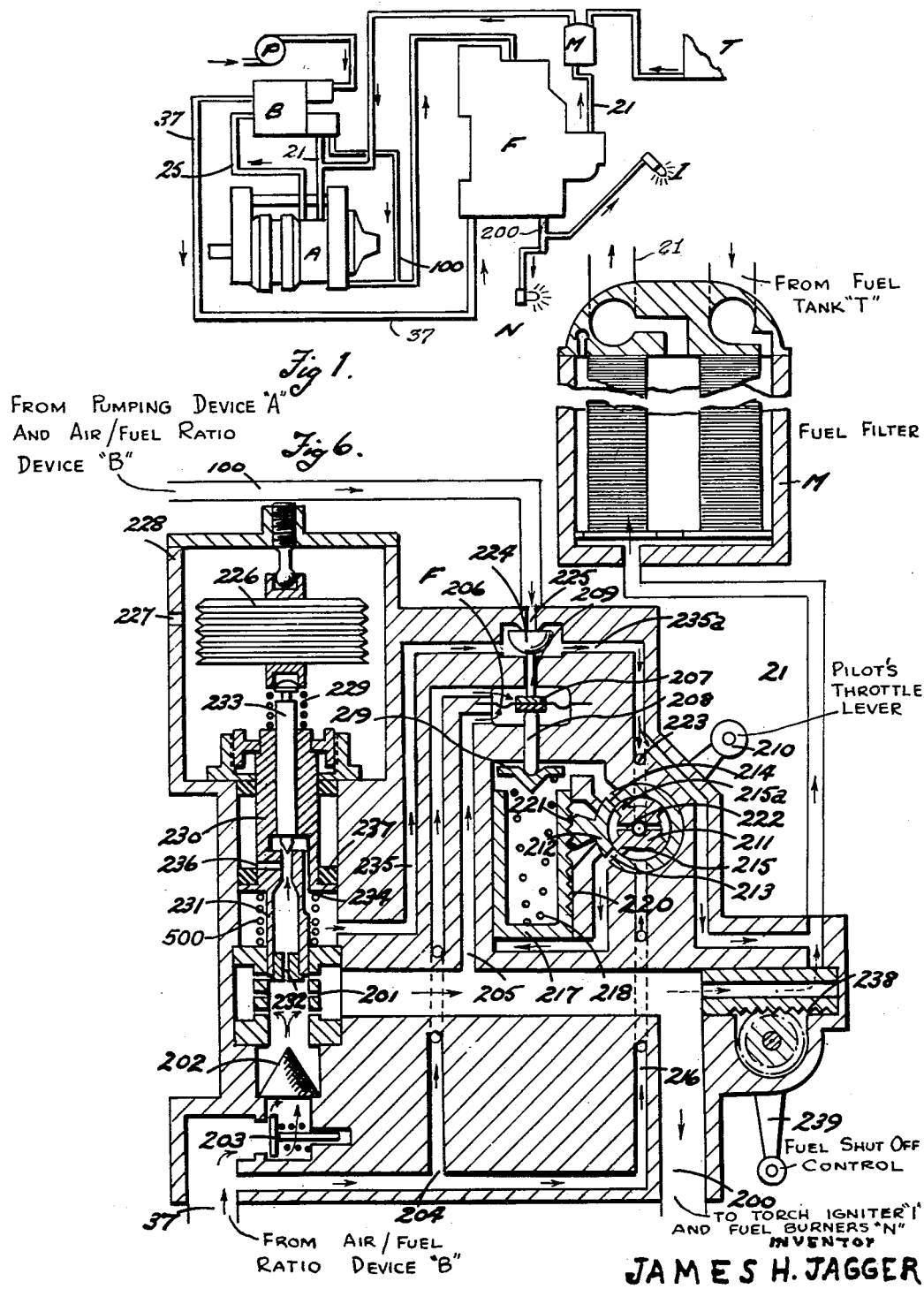

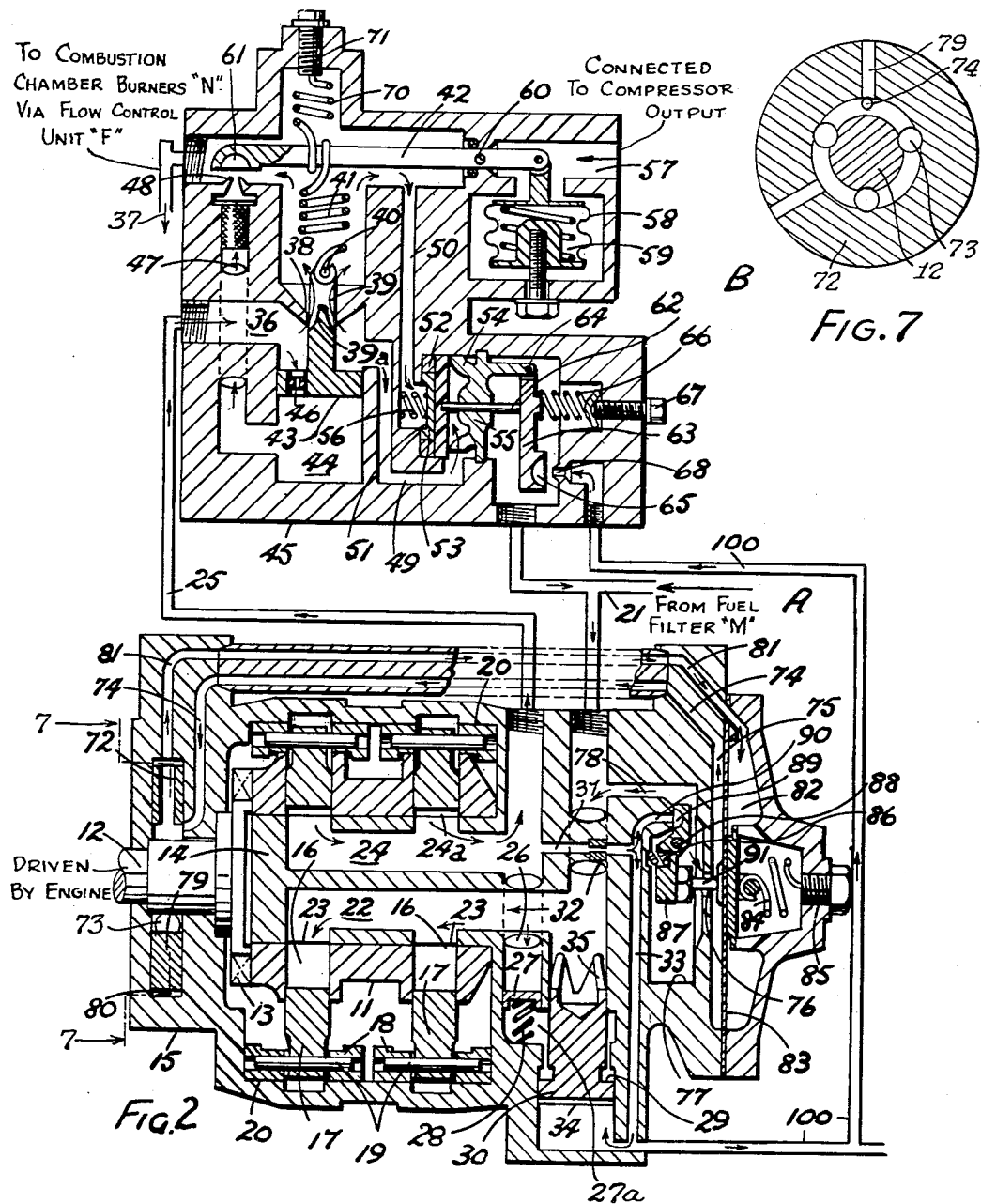

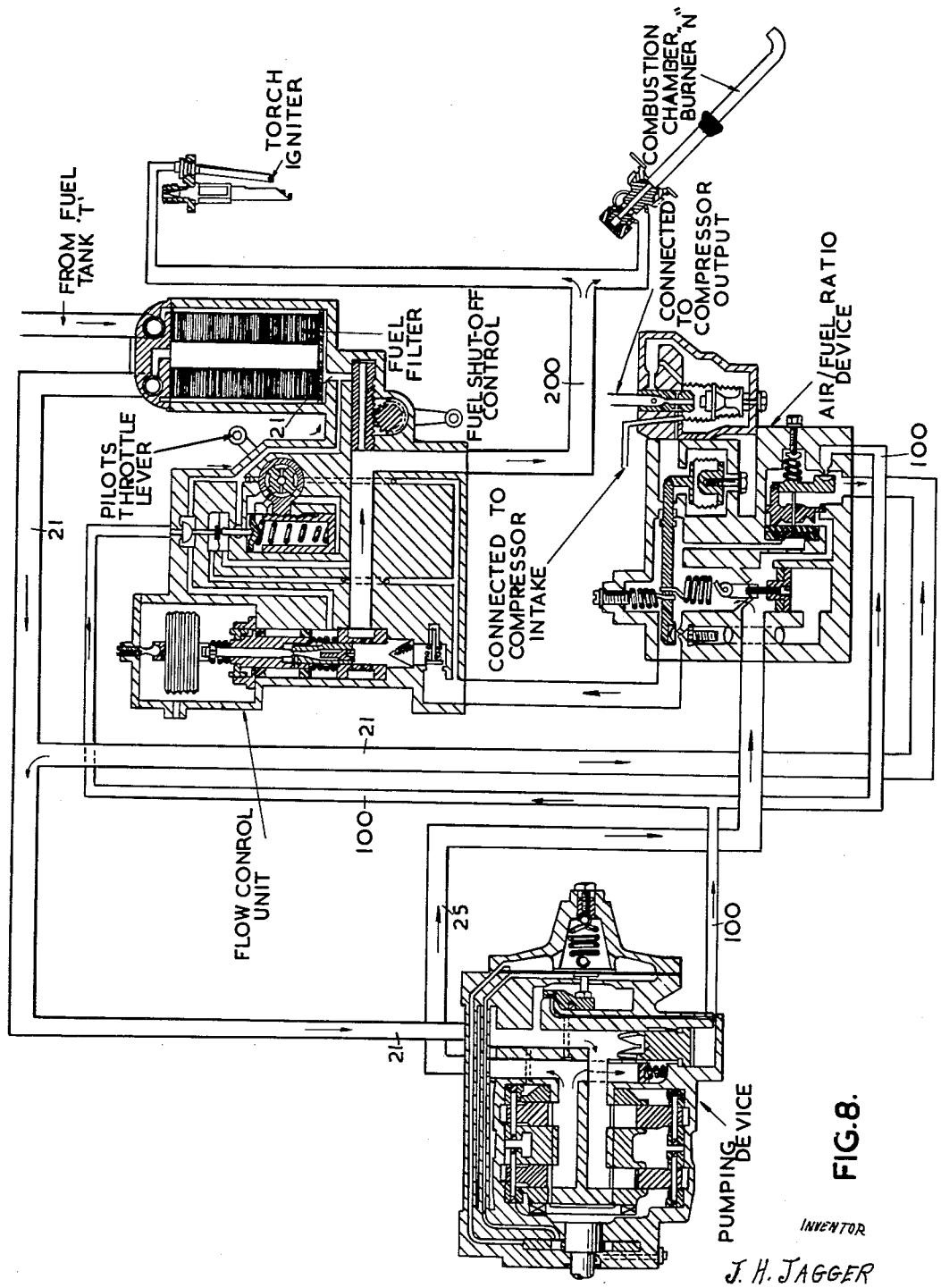

United States Patent Office 2,741,089
Patented Apr. 10, 1956

2,741,089

CONTROLLING FUEL SUPPLY FOR AN AIRCRAFT GAS TURBINE ENGINE DURING ACCELERATION AT DIFFERENT ALTITUDES

James H. Jagger, Coventry, England, assignor to Armstrong Siddeley Motors Limited, Coventry, England Application January 7, 1952, Serial No. 265,329

Claims priority, application Great Britain January 26, 1951

9 Claims. (Cl. 60—39.28)

This invention relates to a system, for regulating the supply of liquid fuel to a gas turbine engine, of the kind including an engine-driven pumping unit the effective delivery of which is controlled by a pressure-responsive control plunger which has the effective delivery pressure applied to one face, while the opposite end of the chamber in which the control plunger works is connected to the end at which the effective delivery pressure is supplied through a restricted orifice, and it also communicates with a passage (hereinafter referred to as the control passage) the pressure in which can be regulated dependently upon operating conditions.

One known form of pumping unit, as aforesaid, includes a variable-delivery pump of the adjustable swash-plate type, the swash-plate being mechanically adjusted by the control plunger, and the said opposite end of the chamber in which the control plunger works contains a compression spring acting on the plunger.

Another known form of pumping unit, as aforesaid, includes a constant-delivery pump associated with a spill valve, the control plunger in this case serving as the spill valve and having no spring bias applied to it.

In each of these forms of pumping unit the pressure in the control passage must be increased in order to increase the effective delivery, and vice versa. Furthermore, each of these forms of pumping unit is provided with means to control the fuel flow at a predetermined maximum engine speed in order to prevent over-speeding of the engine, the means acting upon the pressure in the control passage, or in another control passage in parallel therewith.

It is known to regulate the pressure in the control passage (or in one of them, as the case may be), for a pumping unit of the form first-mentioned (i. e., incorporating a variable-delivery pump of the adjustable swash-plate type), by means of a valve of an air/fuel ratio device having a variable choke through which the effective delivery is passed and which is arranged to set up a pressure difference between the inlet and outlet sides of the choke without the choke being affected by the said pressure difference, which latter is applied for actuating the valve, the choke being actuated responsively to the output pressure of the compressor of the engine.

The invention broadly comprises the combination with a regulating system of the kind specified in the first paragraph of this specification, of an air/fuel ratio device of the kind above-mentioned, the effective delivery of the pumping unit (no matter which of the above-mentioned forms it may take) also passing in series through a flow control device having a variable choke adapted to set up a pressure difference between the inlet and outlet sides of the choke without the choke being affected by the said pressure difference, and the latter is applied for actuating a further valve for one of the control passages, or for another control passage, conjointly with the throttle control of the engine (the two valves being arranged to act in parallel upon the fluid pressure in the said opposite end of the chamber in which the control plunger works), the choke being actuated by a barometric means responsive to the compressor inlet pressure.

In this way the engine is prevented from stalling, due to over-fueling, when the throttle control is rapidly opened. In these latter conditions the flow control device initially allows the fuel supply to the engine to increase rapidly to a point where the air/fuel ratio device takes charge when the flow will be controlled in accordance with requirements determined by a function of the compressor output pressure, these two devices operating independently of one another; while finally the means to control the fuel flow at a predetermined maximum engine speed may take charge in order to prevent over-speeding of the engine.

In the accompanying drawings:

Figure 1 is a diagrammatic layout showing a fuel pump, an air/fuel ratio control device and a fuel flow control device according to the invention;

Figure 2 shows, diagrammatically, a constant delivery pump combined with one form of air/fuel ratio device for delivering fuel to the flow control device shown in Figure 6;

Figure 3 is a graph illustrating the operating conditions of the combination shown in Figure 2;

Figure 4 shows, diagrammatically, an arrangement similar to Figure 2 but with a modified air/fuel ratio device;

Figure 5 is a graph illustrating the operating conditions of the combination shown in Figure 4;

Figure 6 shows, diagrammatically, a fuel flow control device for use with either of the arrangements of Figures 2 or 4;

Figure 7 is a section on the line 7—7 of Figure 2;

Figure 8 is a flow diagram.

In Figure 1 is shown a constant delivery, engine-driven pumping unit, indicated generally at A, an air/fuel ratio device at B, and a flow control unit at F, the various units and their connections being hereinafter described. Also shown in Figure 1 are diagrammatically indicated an air compressor P of the engine, a fuel tank T, a fuel filter M, a torch igniter I, and a fuel burner N.

Referring to Figure 2, the pump has a rotor 11 which is concentrically fast with a driven shaft 12, the two being formed separately but having a toothed engagement at 13 to lock them together. The bore of the rotor, also concentric with the shaft, is journalled on a core 14 which is fast at one end with the pump body 15. The rotor has radial bores 16 in which work pistons 17 having, at their heads, slippers 18 which are journalled on transverse pins 19 of the pistons and make frictional contact with a bore 20 of the pump body, this bore being eccentric with respect to the shaft. Thus, as the shaft 12 is rotated, the slippers, in riding round the bore 20, cause the pistons 17 to be reciprocated in the radial bores 16 of the rotor.

Fuel is fed from a line 21 to a duct 22 in the core, from which duct it is delivered through ports 23 to the radial bores 16 when the pistons are at their radially outmost position, and rotation of the rotor causes the fuel in the bores 16, on the return stroke of the pistons, to be delivered, through other ports 24a to a duct 24 in the core, to a pressure line 25.

Within the pump body there is a duct 26 which communicates with the delivery duct 24 and contains a piston-type valve 27 which is biassed against the delivery pressure by a spring 28. When the pump delivery reaches a predetermined pressure, the valve 27 opens to deliver fuel, through a lateral port 27a, to react on an axial end wall 29 of a peripheral groove in the movable member 30 of a spill or by-pass valve. The delivery duct 24 also communicates, through a duct 31 having a constriction 32, with a duct 33 leading to an opposite end face 34 of the spill valve member 30, whereby, when the pressure in the delivery duct 24 exceeds a predetermined value, the pressure drop across the constriction causes the spill valve member 30 to control the opening of the lateral port 27a communicating with the inlet duct 22. Thus the member 30 can have a hollow end with V-shaped castellations 35 the spaces between which, when the member 30 is moved downwards from the position shown in Figure 2 so as to uncover said lateral port 27a, establish the communication between the ducts 26 and 22.

The pump delivers through the line 25 to a chamber 36 of the air/fuel ratio device B. This chamber communicates with a line 37, from which the combustion chamber burners of the engine are supplied, through a constriction 38 which is normally open but only to an extent controlled by a valve member 39 which is movable responsively to a function of the pressure of the compressor output. The valve member 39 is generally cylindrical, being a sliding fit in the constriction 38, and it is slotted on opposite sides to form curved portions 39a, the axial position of which in the constriction controls the effective area of the passage through the latter, the constriction 38 and member 39 thus constituting a variable choke.

The slotting of the valve member 39 bifurcates it at the top, where a pin 40, which unites the arms formed by the bifurcation, serves as an anchorage for one end of a spring 41 of which the other end is fast with a lever 42 presently to be described. The valve member 39 is fast with a piston 43 working in a cylinder 44 formed in the body 45 of the air/fuel ratio device, and the piston has a small leak path indicated at 46. Movement of the piston 43 causes the valve member 39 to move in the constriction 38 and thus varies the effective area of the constriction and, therefore, the pressure drop from the chamber 36 to the line 37 (although this pressure drop is subsequently restored as hereinafter described). The fuel which passes through the leak path 46 fills the cylinder 44, and the latter has an outlet path 47 which communicates, through a controlled valve orifice 48 (presently to be described) with the line 37.

The pressure drop across the constriction 38 is applied by ducts 49, 50 to opposite sides of a piston 51 working in a ring-like cylinder 52. The piston 51 is fast with a resilient diaphragm 53, which is trapped between the adjacent end of the cylinder 52 and an interrupted peripheral flange 54 of a cup-like member 55 fast with the body 45, and the piston 51 is loaded by a spring 56 to balance the pressure difference when the latter is of a predetermined value.

If the engine throttle be opened suddenly for accelerating the engine, there is a danger that the engine will be overfueled and stall. To prevent this, it is arranged for the fuel supply to the engine, consequent on a sudden opening of the throttle, to be under the control of a function of the compressor output pressure.

This is done, as shown diagrammatically in Figure 2, by communicating the compressor output pressure through a duct 57 into a chamber 58 in which there is a pressure-sensitive capsule 59. Thus, when the compressor output commences to increase consequent on the throttle opening movement, the capsule is compressed, causing the lever 42 to move about its pivot 60 in the body 45 to increase the clearance between a half-ball-valve member 61 and the valve orifice 48. This relieves the pressure in the chamber 44 and enables the piston 43 to be depressed, responsively to the pressure in the chamber 36, against the effort of the spring 41. This depression of the piston 43 moves the valve member 39 to increase the effective area of the constriction 38 in step with the increasing compressor output pressure.

The depression of the piston 43 increases the tension in the spring 41 and thus applies a force to the lever 42 to restore the previous clearance between the half-ball-valve member 61 and the orifice 48, but with the valve member 39 in a new position in which the effective area of the constriction 38 is increased.

At the same time, this further opening of the constriction reduces the pressure drop across it, and the new pressure drop is applied through the ducts 49 and 50 to cause the piston 51 to move, through a push rod 62, an arm 63, pivoted at 64 to the cup-like member 55, moving a half-ball-valve member 65 towards the closed position.

The arm 63 is also acted upon by a spring 66 which, through a screw means 67, enables the effort of the spring 56 to be adjusted.

When the arm 63 moves the half-ball-valve 65 towards the closed position it constricts a valve orifice 68 partially to cut off a leak path, through a control passage 100, extending from the space beneath the movable member 30 of the spill valve to pump supply line 21. This causes the pressure beneath the spill valve member 30 to increase, thus moving it in the direction to reduce the leak path from the duct 26 to the pump intake. In this way a greater proportion of the pump delivery is supplied through the line 25 to the fuel burners and restores the predetermined pressure difference across the constriction 38, permitting the piston 51 to recover and the half-ball-valve 65 to assume a position, relative to the orifice 68, for maintaining the fuel flow from the pump which re-established the pressure difference across the constriction 38.

During acceleration of the engine, the increasing compressor output tends to operate the valve 48, 61 in the opening direction, whereby to allow the piston 43 to move for opening more widely the constriction 38. The resultant temporary drop in the pressure difference across the constriction 38, however, is applied by the piston 51 for decreasing the passage of the fuel through the orifice 68 back to the line 21 from the line 100 whereby the pump is caused to deliver a greater proportion of its output to the line 25 to restore the pressure drop across the constriction 38. In these conditions the supply of fuel to the line 37 is increased to maintain an air/fuel ratio which is at all times below the stalling characteristic of the engine.

The lever 42 besides being biassed downwardly by the spring 41 is also biassed upwardly by a spring 70 with an adjustable anchorage 71, whereby the effort of the spring 41 can be adjusted.

These conditions of operation are illustrated by Figure 3 in which fuel supply in gallons per hour is plotted against the compressor output pressure which, of course, at any given altitude is related to the engine speed. The curves C and D represent, respectively, the engine running and stall lines at sea level, and it will be seen that, with the engine running smoothly in the lower speed range, a sudden opening of the throttle could result in a sufficient supply of fuel to stall the engine before the latter could accelerate sufficiently for adequately increasing the compressor output for burning the extra fuel. The control exerted by the invention is represented by curve E from which it will be seen that the increased supply of fuel, consequent on a sudden opening of the fuel valve, is restricted to a value beneath that at which there is a danger of stalling the engine.

From medium engine speeds upwards, the stall curve rises steeply and, so that high accelerations from such speeds can be obtained, it is arranged that the valve member 39 shall, in that speed range, be in a position in which the constriction 38 offers a minimum of resistance to the fuel flow to the line 37, and this is represented by the steeper portion of the curve E.

To prevent more fuel being supplied to the burners than the engine needs at a predetermined maximum speed, there is a disc 72 which is made rotatively fast with the pump shaft 12, by angularly-spaced balls 73 engaging longitudinal grooves of the shaft and of the disc. The space between the balls 73 communicates, through a duct 74, with the supply line 21 to the pump, the communication being through a diaphragm chamber 75, a clearance space 76, a chamber 77 and a duct 78. The disc 72 has radial bores 79 in which a centrifugal pressure is developed and transmitted, through an annular gallery 80 in the body 15, and a duct 81 to an opposed diaphragm chamber 82.

The diaphragm 83 separating the chambers 77 and 82 is biassed by a tension spring 84, having an adjustable anchorage 85. A compression spring 86 biasses a lever 87 about its pivot 88 to close a valve 89 in a duct 90 leading from the duct 31 with the constriction 32. When there is any tendency to overspeed and the pressure difference in the chambers 77 and 82 exceeds a predetermined figure, as controlled by the spring 84, a stem 91 contacting the diaphragm 83 rocks the lever 87 to unseat the valve 89, allowing some of the fluid in line 33 to return to the intake line through the chamber 77 and duct 78. This reduces the pressure under the spill valve 30, enabling it to by-pass a greater proportion of the pump output to the intake line. In these circumstances, therefore, the fuel flow is controlled by the pump speed only, overriding the air/fuel ratio control.

The previously described acceleration control, operating with the compressor output pressure only, does not operate satisfactorily at high altitudes owing to the air/fuel ratio control limiting the maximum speed of the engine. This is illustrated by Figure 5 in which the curves D1, C1 are the ones which correspond with curves D and C at a particular high altitude. It will be seen that the curve C1 is intercepted by the curve E so that the engine speed cannot rise above the value corresponding with the point of interception. With increasing altitude, therefore, it is necessary to modify the curve E by bringing its steeply rising portion nearer the origin so as to lie between the curves D1 and C1 as shown. This can be done by the pressure sensitive arrangement shown in Figure 4, which enables the air/fuel ratio control to act responsively to the compression ratio of the compressor.

The pressure sensitive arrangement of Figure 4 includes a pressure sensitive capsule 120 which has a common wall 121 with a second, and smaller capsule 122 which is evacuated. The wall 121 carries a movable valve member 123 which, at a predetermined compression ratio, closes the outlet of a venturi passage 124 which otherwise establishes a communication between the interior of the capsule 120 and the compressor outlet through a duct 125. The throat of the venturi passage communicates with an annulus 126 which, in turn, communicates through a duct 128 with the chamber 58. Thus when the valve member 123 is in open position the static pressure in the venturi throat is transmitted to the chamber 58, and when the valve 123 is in closed position the compressor output pressure is transmitted to the said chamber 58.

Pressure from the duct 125 is also delivered, through an adjustable needle valve 127, to the exteriors of the capsules 120 and 122, the pressure in the chamber around the capsules acting on the capsule assembly in the direction for closing the valve member 123. The air which has passed the needle valve 127 also passes into the interior of the capsule 120 through a restrictor orifice 129, the interior of the said capsule 120 communicating, through a duct 130, with the compressor intake.

During a rapid acceleration of the engine the pressure ratio of the compressor increases with speed; and while the valve 123 is in open position a lower pressure than the compressor output pressure is transmitted to the chamber 58 from the throat of the venturi 124. This lower pressure is arranged to produce a fuel flow to the engine at all times below the stall line of the engine. At the same time, a reduced value of the compressor output pressure is also acting on the exterior of the capsule assembly 120, 122 and at a value of the compressor pressure ratio at which a sudden increase in fuel flow will not produce stall conditions, this pressure closes the valve 123.

As the valve 123 closes, the pressure in the chamber 58 rises to the actual value of the compressor outlet pressure since the air flow through the venturi ceases, giving a larger opening of the constriction 38 and hence a suddenly increased fuel flow to the engine.

Since the valve 123 is closed responsively to the compressor pressure ratio, which in turn is related to the speed of the engine, the relationship of the sudden increase in fuel flow to the engine stall line at any altitude will not vary.

For matching the air/fuel ratio device to any particular engine, the needle valve 127 can be adjusted in order to secure that the valve 123 will close at an appropriate pressure ratio of the compressor.

The fuel in the fuel line 37 is delivered to the flow control device F, illustrated by Figure 6, in which the supply to the burners, through a duct 200, is modified to compensate for changes, due to altitude, of the pressure of the compressor intake air. The fuel reaches the duct 200 by passing from the line 37 through a choke 201 which consists of a sleeve with a helically arranged series of ports, there preferably being a filter 202 and a lightly loaded valve 203 in the path of the fuel to the choke. The pressure drop across the choke is applied through ducts 204 and 205 to opposite sides of a diaphragm 206, on a rigid center portion 207 of which bear the adjacent ends of two push rods 208 and 209, both presently to be described.

The pilot's throttle lever is shown at 210 and it has fast with it a longitudinally fluted valve member 211 working in a rotatable sleeve 212 having two angularly-spaced ports 213 and 214. When the lever 210 is moved clockwise in the figure for opening the throttle, lands 215 and 215a of the member 211 respectively uncover the ports 213 and 214, and fuel from the line 37 flows through a duct 216, and the port 213, for its pressure to be applied to the bottom of a piston 217 to raise the latter against the bias of a spring 218 which normally balances the pressure difference acting on the diaphragm 206. While the piston is moving upwards, the fuel above it escapes through port 214 of the sleeve 212 into the interior of the latter and then through a radial duct 222 into an axial duct of the member 211 communicating with a duct 223 leading back to the pump intake line 21.

When the piston 217 is thus raised it increases the compression in the spring 218, urging a spring carrier 219 to deflect the diaphragm 206 through the push rod 208, and at the same time rack teeth 220 of the piston, constantly meshing coacting teeth of a quadrant 221 fast with the sleeve 212, rotates the sleeve 212 for the ports 213 and 214 respectively to catch up with, and be closed by the lands 215 and 215a.

The movement of the diaphragm 206, due to the rising of the piston 217, is transmitted through the push rod 209 to move a half-ball-valve member 224 (which is open during steady running of the engine) towards the position for closing an orifice 225 communicating with the control line 100.

The fuel flow device also includes a barometric capsule 226 which is subjected to ambient atmospheric pressure or to the compressor intake pressure, through a hole 227 in a casing 228, the capsule containing air at a predetermined pressure.

At sea-level the capsule 226 is maintained in a relatively collapsed condition by a spring 229 which re-acts upon a piston-like member 230 having a skirt 231 at its lower end. This skirt, at sea-level, is in its uppermost position and leaves most of the parts of the choke 201 uncovered. Within the skirt is a restrictor 232 through which fuel from the line 37 acts to unseat a needle valve 233 for opening a leak path through ducts 234 and 235 back to the pump supply line 21.

With increasing altitude the capsule 226 moves the valve needle 233 to close the leak path, and this causes the fuel entering the restrictor 232 to pass through a duct 236 to act on an annulus 237 for depressing the member 230. Depression of the latter progressively cuts off an appropriate number of the ports in the choke 201 and increases the pressure difference across the choke. This increased pressure difference, acting upon the diaphragm 206, moves the half-ball-valve 224 in the opening direction, allowing fuel from the line 100 to pass to the pump supply line 21 through a duct 235a. In this way the pressure, acting through the line 100 on the bottom of the spill valve member 30, is relieved and allows the latter to descend for by-passing a greater proportion of the pump output back to the pump intake. This reduces the flow of fuel through the line 37 to the choke 201, and also the pressure of the fuel at the upstream side of the said choke. In these conditions the designed pressure drop across the choke 201 is restored, but with the piston-like member 230 in the new position, and the diaphragm acts to move the half-ball-valve 224 towards the closed position.

A rack-operated fuel shut-off valve 238 can be operated by a lever 239 for diverting the communication of the downstream side of the choke 201 from the line 200 to the pump intake line 21, the valve 238 cutting off the line 200, and the downstream side of the choke 201 communicating with the intake line 21 through a bore of the valve 238.

To provide for efficient operation of the half-ball-valve 224 in circumstances when the pressure difference, due to operating conditions, across the choke is small, use may be made of a spring-loaded valve 203 for the purpose of exaggerating the pressure difference.

What I claim as my invention and desire to secure by Letters Patent of the United States is:

1. A regulating system, for the supply of liquid fuel to a gas turbine engine including an air compressor and a burner for the fuel, comprising the combination of a pumping unit to be driven from the engine, an air/fuel ratio device for regulating the fuel supply at both steady and fluctuating engine speeds, and a flow control arrangement operative to vary the fuel supply dependently on atmospheric pressure changes at varying altitudes, said unit having a control plunger, a communication from a delivery passage of said unit to one face of said plunger, a communication, containing a restrictor orifice, from said delivery passage to an opposite face of said plunger, said plunger acting as a movable valve member for controlling the effective delivery from said delivery passage, and said device and said arrangement connected to receive said effective delivery in series, a control passage communicating with said opposite face of said plunger, a variable choke in said air/fuel ratio device, said choke in the path of a communication between said delivery passage and said arrangement, said choke setting up a pressure difference between its inlet and outlet sides without itself being affected by said pressure difference, said device having a valve means for applying said pressure difference for actuating said valve of said device for regulating the pressure in said control passage, means for varying said choke responsively to a function of the output pressure of the compressor of the engine whereby to maintain constant the pressure difference between the inlet and outlet sides of said choke, said flow control arrangement having a variable choke in the path of a communication between said delivery passage and said burner, said choke of said arrangement setting up a pressure difference between its inlet and outlet sides without itself being affected by said pressure difference, a throttle control for said engine, said arrangement having a valve, means connected to act conjointly with said throttle control for applying the last-mentioned pressure difference for actuating said valve of said arrangement for regulating the pressure in said control passage and also to maintain constant the pressure difference between the inlet and outlet sides of the choke of said arrangement, said valves actuated by said pressure differences set up by said chokes of said device and said arrangement communicating in parallel with said control passage for regulating the pressure therein, and a barometric means responsive to the compressor inlet pressure acting on said choke of said arrangement to vary its effective size.

2. A regulating system, for the supply of liquid fuel to a gas turbine engine including an air compressor and a burner for the fuel, comprising the combination of a pumping unit to be driven from the engine, an air/fuel ratio device for regulating the fuel supply at both steady and fluctuating engine speeds, and a flow control arrangement operative to vary the fuel supply dependently on atmospheric pressure changes at varying altitudes, said unit having a control plunger, a communication from a delivery passage of said unit to one face of said plunger, a communication, containing a restrictor orifice, from said delivery passage to an opposite face of said plunger, said plunger acting as a movable valve member for controlling the effective delivery from said delivery passage, and said device and said arrangement connected to receive said effective delivery in series, a control passage communicating with said opposite face of said plunger, a variable choke in said air/fuel ratio device, said choke in the path of a communication between said delivery passage and said arrangement, said choke setting up a pressure difference between its inlet and outlet sides without itself being affected by said pressure difference, a piston, means communicating the pressures at the inlet and outlet sides of said choke to opposite sides of said piston, resilient means acting on said piston to balance it when said pressure difference is of a predetermined value, means connecting said piston for actuating a valve of said device for regulating the pressure in said control passage, means for varying said choke responsively to a function of the output pressure of the compressor of the engine whereby to maintain constant the pressure difference between the inlet and outlet sides of said choke, said flow control arrangement having a variable choke in the path of a communication between said delivery passage and said burner, said choke of said arrangement setting up a pressure difference between its inlet and outlet sides without itself being affected by said pressure difference, a throttle control for said engine, said arrangement having a valve, means connected to act conjointly with said throttle control for applying the last-mentioned pressure difference for actuating said valve of said arrangement for regulating the pressure in said control passage and also to maintain constant the pressure difference between the inlet and outlet sides of the choke of said arrangement, said valves actuated by said pressure differences set up by said chokes of said device and said arrangement communicating in parallel with said control passage for regulating the pressure therein, and a barometric means responsive to the compressor inlet pressure acting on said choke of said arrangement to vary its effective size.

3. A regulating system, for the supply of liquid fuel to a gas turbine engine including an air compressor and a burner for the fuel, comprising the combination of a pumping unit to be driven from the engine, an air/fuel ratio device for regulating the fuel supply at both steady and fluctuating engine speeds, and a flow control arrangement operative to vary the fuel supply dependently on atmospheric pressure changes at varying altitudes, said unit having a control plunger, a communication from a delivery passage of said unit to one face of said plunger, a communication, containing a restrictor orifice, from said delivery passage to an opposite face of said plunger, said plunger acting as a movable valve member for controlling the effective delivery from said delivery passage and said device and said arrangement connected to receive said effective delivery in series, a control passage communicating with said opposite face of said plunger, a variable choke in said air/fuel ratio device, said choke in the path of a communication between said delivery passage and said arrangement, said choke setting up a pressure difference between its inlet and outlet sides without itself being affected by said pressure difference, said device having a valve means for applying said pressure difference for actuating said valve of said device for regulating the pressure in said control passage, a piston fast with a movable member of said choke, said piston having a leak path in parallel with said choke, a movable valve member controlling said leak path, means for moving said movable valve member responsively to a function of the output pressure of the compressor of the engine whereby to vary the effective size of said leak path for enabling said movable member of said choke to adjust itself for maintaining constant the pressure difference between its inlet and outlet sides, said flow control arrangement having a variable choke in the path of a communication between said delivery passage and said burner, said choke of said arrangement setting up a pressure difference between its inlet and outlet sides without itself being affected by said pressure difference, a throttle control for said engine, said arrangement having a valve, means connected to act conjointly with said throttle control for applying the last-mentioned pressure difference for actuating said valve of said arrangement for regulating the pressure in said control passage and also to maintain constant the pressure difference between the inlet and outlet sides of the choke of said arrangement, said valves actuated by said pressure differences set up by said chokes of said device and said arrangement communicating in parallel with said control passage for regulating the pressure therein, and a barometric means responsive to the compressor inlet pressure acting on said choke of said arrangement to vary its effective size.

4. A regulating system, for the supply of liquid fuel to a gas turbine engine including an air compressor and a burner for the fuel, comprising the combination of a pumping unit to be driven from the engine, an air/fuel ratio device for regulating the fuel supply at both steady and fluctuating engine speeds, and a flow control arrangement operative to vary the fuel supply dependently on atmospheric pressure changes at varying altitudes, said unit having a control plunger, a communication from a delivery passage of said unit to one face of said plunger, a communication, containing a restrictor orifice, from said delivery passage to an opposite face of said plunger, said plunger acting as a movable valve member for controlling the effective delivery from said delivery passage and said device and said arrangement connected to receive said effective delivery in series, a control passage communicating with said opposite face of said plunger, a variable choke in said air/fuel ratio device, said choke in the path of a communication between said delivery passage and said arrangement, said choke setting up a pressure difference between its inlet and outlet sides without itself being affected by said pressure difference, said device having a valve means for applying said pressure difference for actuating said valve of said device for regulating the pressure in said control passage, a piston fast with a movable member of said choke, said piston having a leak path in parallel with said choke, a movable valve member controlling said leak path, a pressure sensitive device, a lever interconnecting said pressure sensitive device and said movable valve member, means for subjecting said pressure sensitive device to a pressure which is a function of the output pressure of the compressor of the engine whereby to vary the effective size of said leak path for enabling said movable member of said choke to adjust itself for maintaining constant the pressure difference between its inlet and outlet sides, said flow control arrangement having a variable choke in the path of a communication between said delivery passage and said burner, said choke of said arrangement setting up a pressure difference between its inlet and outlet sides without itself being affected by said pressure difference, means connected to act conjointly with said throttle control for applying the last-mentioned pressure difference for actuating said valve of said arrangement for regulating the pressure in said control passage and also to maintain constant the pressure difference between the inlet and outlet sides of the choke of said arrangement, said valves actuated by said pressure differences set up by said chokes of said device and said arrangement communicating in parallel with said control passage for regulating the pressure therein, and a barometric means responsive to the compressor inlet pressure acting on said choke of said arrangement to vary its effective size.

5. A regulating system, according to claim 4, in which said pressure sensitive device is a pneumatic capsule which is biassed to an extended position, said capsule being in a chamber to which the compressor output pressure is led.

6. A regulating system, according to claim 4, in which said pressure sensitive device is a pneumatic capsule which is biassed to an extended position, said capsule being in a chamber to which is led through a change-over device a pressure which is a function of the compressor output pressure, said change-over device including a pair of aligned, opposed pneumatic capsules of different sizes, a common wall at the adjacent ends of said pair of capsules, a coaxial duct in the larger capsule of said pair, a valve member fast with said common wall and coacting with the adjacent end of said duct, the remote end of said capsule to receive air at the compressor output pressure, said duct of venturi formation and having a lateral communication with said chamber, an envelope containing said pair of capsules, a restrictor through which the compressor output air passes with pressure reduction to be applied to the exterior of said pair of capsules, and a restrictor through which air from said envelope passes with further pressure reduction to the interior of the larger of said pair of capsules, the interior of the larger of said pair of capsules communicating with the compressor intake, whereby, above a predetermined pressure ratio of said compressor, the valve member fast with said common wall closes said adjacent end of said duct to cause the compressor output pressure to be applied to said chamber, and below said predetermined pressure ratio said valve member fast with said common walls opens said adjacent end of said duct to cause a lower pressure than that of said compressor output to be applied to said chamber.

7. A regulating system, for the supply of liquid fuel to a gas turbine engine including an air compressor and a burner for the fuel, comprising the combination of a pumping unit to be driven from the engine, an air/fuel ratio device for regulating the fuel supply at both steady and fluctuating engine speeds, and a flow control arrangement operative to vary the fuel supply dependently on atmospheric pressure changes at varying altitudes, said unit having a control plunger, a communication from a delivery passage of said unit to one face of said plunger, a communication, containing a restrictor orifice, from said delivery passage to an opposite face of said plunger, said plunger acting as a movable valve member for controlling the effective delivery from said delivery passage and said device and said arrangement connected to receive said effective delivery in series, a control passage communicating with said opposite face of said plunger, a variable choke in said air/fuel ratio device, said choke in the path of a communication between said delivery passage and said arrangement, said choke setting up a pressure difference between its inlet and outlet sides without itself being affected by said pressure difference, said device having a valve means for applying said pressure difference for actuating said valve of said device for regulating the pressure in said control passage, means for varying said choke responsively to a function of the output pressure of the compressor of the engine whereby to maintain constant the pressure difference between the inlet and outlet sides of said choke, said flow control arrangement having a variable choke in the path of a communication between said delivery passage and said burner, said choke of said arrangement setting up a pressure difference between its inlet and outlet sides without itself being affected by said pressure difference, a diaphragm, means applying the pressures at the inlet and outlet sides of the choke of said arrangement to opposite sides of said diaphragm, a throttle control for said engine, a resilient connection between said throttle control and said diaphragm whereby the latter is stressed dependently upon the position to which said throttle control is actuated, a valve of said arrangement controlling a communication between said control passage and the intake of said pumping unit, a connection between said diaphragm and a movable valve member of said valve of said arrangement whereby to regulate the pressure in said control passage and also to maintain constant the pressure difference between the inlet and outlet sides of the choke of said arrangement, said valves actuated by said pressure differences set up by said chokes of said device and said arrangement communicating in parallel with said control passage for regulating the pressure therein, and a barometric means responsive to the compressor inlet pressure acting on said choke of said arrangement to vary its effective size.

8. A regulating system, according to claim 1, in which the choke of said arrangement comprises a laterally ported sleeve and a coaxial movable sleeve fast with a piston, said movable sleeve obturating different numbers of the ports when said sleeves are in different relative axial positions, said movable sleeve communicating with the upstream side of said ported sleeve and containing a restrictor and a leak path to the intake of said pumping unit, a needle valve controlling said leak path, and a barometric capsule responsive to the compressor inlet pressure, said capsule connected when distending to close said needle valve and divert fluid from said leak path to said piston for causing said movable sleeve to obturate a greater number of said parts whereby to adjust the pressure difference across said choke of said arrangement.

9. A regulating system, according to claim 2, in which the means for varying the choke of said air/fuel ratio device comprises, a piston fast with a movable member of said choke, said choke piston having a leak path in parallel with said choke, a movable valve member controlling said leak path, a pressure sensitive device, a lever interconnecting said pressure sensitive device and said movable valve member, means for subjecting said pressure sensitive device to a pressure which is a function of the output pressure of the compressor of the engine whereby to vary the effective size of said leak path for enabling said movable member of said choke to adjust itself for maintaining constant the pressure difference between its inlet and outlet sides, and in which the means for applying the pressure difference set up by the choke of said arrangement for regulating the pressure in the control passage and for maintaining that pressure difference constant comprises a diaphragm, means applying the pressures at the inlet and outlet sides of the choke of said arrangement to opposite sides of said diaphragm, a throttle control for said engine, a resilient connection between said throttle control and said diaphragm whereby the latter is stressed dependently upon the position to which said throttle control is actuated, a valve of said arrangement controlling a communication between said control passage and the intake of said pumping unit, a connection between said diaphragm and a movable valve member of said valve of said arrangement, said valves actuated by said pressure differences set up by said chokes of said device and said arrangement communicating in parallel with said control passage for regulating the pressure therein, said choke of said arrangement comprising a laterally ported sleeve and a coaxial movable sleeve fast with a piston, said movable sleeve obturating different numbers of the ports when said sleeves are in different relative axial positions, said movable sleeve communicating with the upstream side of said ported sleeve and containing a restrictor and a leak path to the intake of said pumping unit, a needle valve controlling said leak path of said arrangement, and a barometric capsule responsive to the compressor inlet pressure, said capsule connected when distending to close said needle valve for diverting fluid from said leak path of said arrangement to urge said piston of said arrangement for causing said movable sleeve to obturate a greater number of said ports whereby to adjust the pressure difference across said choke of said arrangement.

References Cited in the file of this patent

UNITED STATES PATENTS

| 2,214,558 | Kronmiller | Sept. 10, 1940 |
| 2,424,035 | Ifield | July 15, 1947 |
| 2,429,005 | Watson et al. | Oct. 14, 1947 |
| 2,450,535 | Watson et al. | Oct. 5, 1948 |
| 2,503,048 | Ifield | Apr. 4, 1950 |
| 2,524,444 | Ifield | Oct. 3, 1950 |
| 2,537,681 | Lawrence | Jan. 9, 1951 |
| 2,584,523 | Work | Feb. 5, 1952 |
| 2,604,756 | Greenland | July 29, 1952 |
| 2,618,927 | Chandler | Nov. 25, 1952 |